(12) United States Patent
Smart

(10) Patent No.: US 6,973,104 B2
(45) Date of Patent: Dec. 6, 2005

(54) PULSE CONTROL IN LASER SYSTEMS

(75) Inventor: Donald V. Smart, Boston, MA (US)

(73) Assignee: GSI Lumonics Corporation, Billerica, MA (US)

( * ) Notice: Subject to any disclaimer, the term of this patent is extended or adjusted under 35 U.S.C. 154(b) by 0 days.

(21) Appl. No.: 11/005,981

(22) Filed: Dec. 7, 2004

(65) Prior Publication Data
US 2005/0105568 A1 May 19, 2005

Related U.S. Application Data

(63) Continuation of application No. 09/096,600, filed on Jun. 12, 1998, now Pat. No. 6,339,604, and a continuation of application No. 09/633,837, filed on Aug. 7, 2000, now Pat. No. 6,831,936.

(51) Int. Cl.[7] .............................................. H01S 3/117
(52) U.S. Cl. ............................. 372/13; 372/25; 372/26
(58) Field of Search ............................. 372/13, 25, 26, 372/108; 219/121.61

(56) References Cited

U.S. PATENT DOCUMENTS

| | | | |
|---|---|---|---|
| 3,703,687 A | 11/1972 | Maydan | |
| 3,747,019 A | 7/1973 | Koechner et al. | |
| 4,337,442 A | 6/1982 | Mauch | |

(Continued)

FOREIGN PATENT DOCUMENTS

| | | | | |
|---|---|---|---|---|
| JP | 62086851 A2 | 4/1987 | ............ | H01L 27/01 |

(Continued)

OTHER PUBLICATIONS

Teradyne, "Enhancements for Productivity and Simplified Maintenance: Link Spirit; Sun 3 Workstation; Diode-Pumped Nd: YLF Laser: Three New Options for the M218 Laser Processing System," 1988.

(Continued)

Primary Examiner—Minsun Oh Harvey
Assistant Examiner—Cornelius Jackson
(74) Attorney, Agent, or Firm—Gauthier & Connors, LLP

(57) ABSTRACT

A pulsed laser system includes a laser pump, a laser rod, a reflector interposed between the laser pump and the laser rod, through which energy from the laser pump enters the laser rod, an output reflector through which energy is emitted from the laser rod, a switch interposed between the laser rod and the output reflector, and a control device. The switch, when closed, causes energy to be stored in the laser rod and, when opened, allows energy to be emitted from the laser rod during an emission period. The control device allows a primary laser pulse emitted from the laser rod during the emission period to impinge on a workpiece and blocks from the workpiece secondary laser emission occurring during the emission period after emission of the primary pulse. The pulsed laser system is operated over a range of repetition rates, so as to cause laser energy to be emitted during a plurality of emission periods at each repetition rate. At least a portion of the laser energy emitted during the emission periods is directed toward the target structure in order to perform passive or functional trimming of the target structure. The switch is closed for a fixed, predetermined period of time prior to each emission period regardless of repetition rate of the primary laser pulse within the range of repetition rates in order to store energy in the laser rod. The pump is operated continuously at constant power.

15 Claims, 3 Drawing Sheets

U.S. PATENT DOCUMENTS

| | | |
|---|---|---|
| 4,341,446 A | 7/1982 | Burkel |
| 4,412,330 A | 10/1983 | Mauck et al. |
| 4,461,005 A | 7/1984 | Ward et al. |
| 4,483,005 A | 11/1984 | Smart |
| 4,590,598 A | 5/1986 | O'Harra, II |
| 4,601,037 A | 7/1986 | McDonald |
| 4,604,513 A | 8/1986 | Lim |
| 4,675,872 A | 6/1987 | Popek et al. |
| 4,708,473 A | 11/1987 | Metzdorff et al. |
| 4,730,105 A | 3/1988 | Mitschke et al. |
| 4,901,323 A | 2/1990 | Hawkins et al. |
| 4,920,541 A | 4/1990 | Baumgartner et al. |
| 5,127,019 A | 6/1992 | Epstein et al. |
| 5,128,601 A | 7/1992 | Orbach et al. |
| 5,157,676 A | 10/1992 | Wilcox |
| 5,168,400 A | 12/1992 | Moses |
| 5,197,074 A | 3/1993 | Emmons, Jr. et al. |
| 5,226,051 A | 7/1993 | Chan et al. |
| 5,243,615 A | 9/1993 | Ortiz et al. |
| 5,339,323 A | 8/1994 | Hunter et al. |
| 5,365,532 A | 11/1994 | Klaras et al. |
| 5,408,480 A | 4/1995 | Hemmati |
| 5,448,417 A | 9/1995 | Adams |
| 5,453,594 A | 9/1995 | Konecny |
| 5,466,484 A | 11/1995 | Spraggins et al. |
| 5,596,590 A | 1/1997 | De Ruyter et al. |
| 5,719,372 A | 2/1998 | Togari et al. |
| 5,721,749 A | 2/1998 | Holleman et al. |
| 5,724,170 A | 3/1998 | Aizawa |
| 5,730,811 A | 3/1998 | Azad et al. |
| 5,742,397 A | 4/1998 | Kim |
| 5,812,569 A | 9/1998 | Walker et al. |
| 5,816,573 A | 10/1998 | Bolling, Sr. |
| 5,982,790 A | 11/1999 | Grossman et al. |
| 6,009,110 A | 12/1999 | Wiechmann et al. |
| 6,021,154 A | 2/2000 | Unternahrer |
| 6,054,673 A | 4/2000 | Chen |
| 6,172,325 B1 | 1/2001 | Baird et al. |
| 6,172,331 B1 | 1/2001 | Chen |
| 6,339,604 B1 | 1/2002 | Smart |
| 6,418,154 B1 | 7/2002 | Kneip et al. |
| 2002/0005396 A1 | 1/2002 | Baird et al. |

FOREIGN PATENT DOCUMENTS

| | | | | |
|---|---|---|---|---|
| JP | 07-124763 | 5/1995 | .......... | B23K 26/00 |
| JP | 08-037329 | 2/1996 | .......... | H01S 3/082 |
| JP | 08-141758 | 6/1996 | .......... | B23K 26/00 |

OTHER PUBLICATIONS

General Scanning Inc., "MX Laser Processing Systems Applications Manual," chapter 3, pp. 3-1 through 3-6, 1994.

General Scanning Inc., "Laser Link Fusing: Guidelines for the Applications of M3XX Laser Systems in Semiconductor Link Fusing Processes," Jan., 1997.

PULSE CONTROL IN LASER SYSTEMS

This application is a continuation of Ser. No. 09/096,600, filed Jun. 12, 1998 now U.S. Pat. No. 6,339,604 and is a continuation of Ser. No. 09/633,837, filed on Aug. 7, 2000 now U.S. Pat. No. 6,831,936.

BACKGROUND OF THE INVENTION

This invention relates to controlling pulses in laser systems and more particularly relates to controlling the width and energy of pulses at differing repetition rates during micromachining procedures such as resistor trimming or capacitor trimming.

The pulse width of a laser typically increases with increased repetition rate (i.e., the rate at which pulses are emitted by the laser). This is because at high repetition rates the time to store energy in the laser rod prior to each pulse is short and at low repetition rates the time to store energy in the laser rod prior to each pulse is long. Hence, on a per pulse basis, there is great variation in the energy output and temporal pulse width as the repetition rate is varied.

This effect is due to the fact that the energy that can be extracted from a laser rod depends on the energy stored in the rod. For example, at a repetition rate of 30 kilohertz there are only about 33 microseconds available to store and open a Q-switch to allow a laser pulse to be emitted, whereas at 1 kilohertz there are about a thousand microseconds available to store and Q-switch. The gain in a laser is proportional to quantity of energy stored in the rod. Therefore, when a laser pulse is instigated at a low repetition rate it sweeps up much more quickly than it would at a higher frequency because there is more energy stored in the rod, resulting in a shorter temporal pulse width.

For a given energy per pulse the peak power varies inversely with the laser pulse width. Therefore, the peak power of a 300-nanosecond pulse is much less than the peak power of a 100-nanosecond pulse having the same total energy. The total energy per pulse delivered to the workpiece is typically controlled by a device that attenuates the beam; laser pulses at 1 kilohertz would be attenuated more than laser pulses at 10 kilohertz in order for the pulses in each instance to have the same total energy.

It is possible to widen laser pulses provided by a given laser at low repetition rates by lowering the energy stored in the laser rod when the laser is operated at low repetition rates. This can be accomplished by lowering the amount of energy that enters the rod from the laser pump. The Light Wave Electronics Model 110 laser works according to this principle.

It is also possible to ensure similar pulse widths at differing repetition rates by pumping energy into the laser rod prior to each laser pulse for about the same storage time period regardless of the repetition rate. After this high energy storage time but prior to opening of the Q-switch, the energy that is pumped into the laser rod is reduced to a level that is just above a threshold required to compensate for losses in the energy stored in the laser rod. This reduced energy level can be maintained until the Q-switch is opened to allow a pulse to be released from the laser rod.

General Scanning's M320 pulsed laser system is an example of a system that does not ensure similar pulse widths at differing repetition rates. In this system, an acousto-optic modulator (AOM), is placed between the laser and the workpiece. As the laser scans over a workpiece, the acousto-optic modulator blocks laser pulses from impinging on the workpiece except when a laser pulse is needed to remove a ink on the workpiece. In order to remove a link, the acousto-optic modulator allows a single pulse, emitted immediately after opening of the Q-switch, to impinge on the link. The acousto-optic modulator can allow only a fraction of the energy of the pulse to impinge on the link, as desired.

Togari et al., U.S. Pat. No. 5,719,372 describes a laser marking system in which laser pulses create holes in a workpiece that form a marking. Each emission period, during which the Q-switch is off (open), is sufficiently long to allow the laser to emit a primary emission pulse and a plurality of secondary emission pulses, all of which impinge upon the workpiece. The intensities of these primary and secondary emission pulses are less than the intensity of the single emission pulse that would be emitted if the emission period were shorter and the repetition rate kept the same. The low-power secondary emissions deliver extra energy to the workpiece. The patent claims that the low-power secondary emissions result in improved visibility of marking lines in a workpiece that includes a resin film containing carbon.

SUMMARY OF THE INVENTION

One aspect of the invention features a pulsed laser system that includes a laser pump (e.g., a continuous wave (CW) pump), a laser rod, a reflector interposed between the laser pump and the laser rod, through which energy from the laser pump enters the laser rod, an output reflector through which energy is emitted from the laser rod, and a switch (e.g., a Q-switch) interposed between the laser rod and the output reflector. Further there is a control device, which may be external to the laser resonator. The Q-switch, when closed, causes energy to be stored in the laser rod and, when opened, allows energy to be emitted from the laser rod during an emission period. The control device allows a primary laser pulse emitted from the laser rod during the emission period to impinge on a workpiece and prevents at least a portion of secondary laser emission occurring after the primary pulse during the emission period from impinging on the workpiece.

The diode pumped laser technology according to the invention provides flexibility in and control over the pulse width, along with the repetition rate, in order to optimize performance. The invention makes it possible to use a laser that has short pulse widths at high repetition rates to process a workpiece (for example, to perform resistor trimming) at low repetition rates without emitting unduly short pulses. The low repetition rates may be especially useful for certain applications such as trimming high valued resistors.

The invention does not require any reduction in the output of the laser pump in order to provide wide pulses at low repetition rates. Thus, it is not necessary to redesign or otherwise accommodate the power supply electronics and feedback circuitry that are designed to ensure a stable output of the laser pump. Also, the invention does not require energy to be pumped into the laser rod at a reduced level during the portion of the emission period following emission of the primary laser pulse. Thus, the invention need not concern itself with errors that might be introduced into the total energy stored in the laser rod following emission of the primary laser pulse, which errors would be especially significant at low attenuation.

Because a control device is provided that prevents unwanted output emitted during the emission period after emission of the primary pulse from impinging on the workpiece, this portion of the laser output does not affect the temperature of the workpiece, and therefore does not affect measurements that might take place prior to each primary pulse, which may be temperature-sensitive, and does not affect performance of the workpiece. For example, in trimming of thick-film resistors, resistance measurements might take place immediately prior to each primary pulse. In micromachining of a semiconductor circuit on a silicon substrate, elimination of secondary pulses and a continuous wave output can prevent undue heating of the silicon substrate and thereby protect the silicon substrate against damage.

Another aspect of the invention features a method in which the pulsed laser system is operated over a range of repetition rates, so as to cause laser energy to be emitted during a plurality of emission periods at each repetition rate. At least a portion of the laser energy emitted during the emission periods is directed toward the target structure. The switch is closed for a fixed, predetermined period of time prior to each emission period regardless of repetition rate of the primary laser pulse within the range of repetition rates. The pump is operated continuously at constant power.

Numerous other features, objects, and advantages of the invention will become apparent from the following detailed description when read in connection with the accompanying drawings.

BRIEF DESCRIPTION OF THE DRAWINGS

FIG. 6 is the same as FIG. 4 with the secondary, unwanted pulses removed.

DETAILED DESCRIPTION

Figure 1:
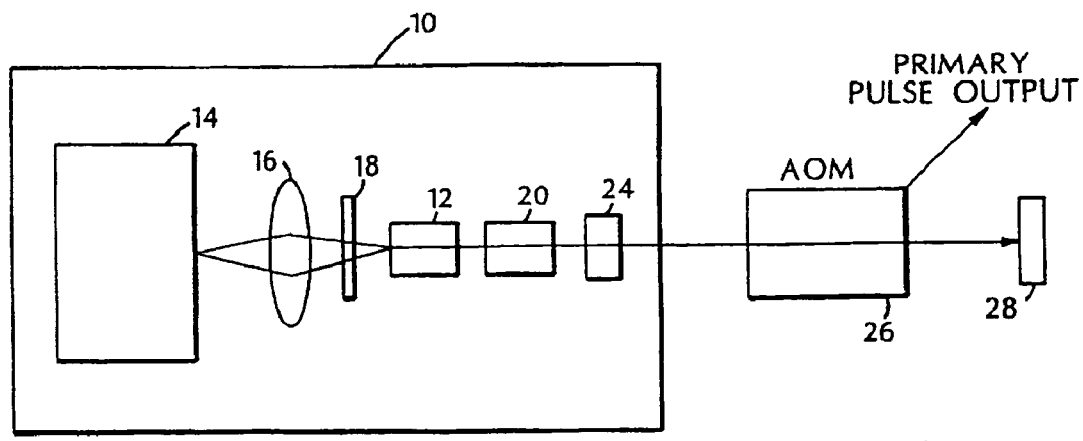
FIG. 1 is a block diagram that discloses the major components of a laser system according to the invention.

In trimming of thick-film resistors, the optimal peak laser pulse power, pulse width, and pulse energy depends on the type and thickness of the resistor paste material.

For example, high-ohm pastes generally contain less metal than low-ohm pastes and are generally thicker than low-ohm pastes. High-ohm pastes generally require a longer laser pulse width than low-ohm pastes because heat conduction in the semi-insulating high-ohm pastes generally takes more time than in low-ohm pastes.

In contrast, low-ohm pastes tend to contain a great deal of metal. These pastes have a tendency to conduct heat laterally away from the kerf (cut) produced by the laser pulse. Short laser pulses tend to limit the likelihood of this lateral conduction in these low-ohm pastes.

Thick-film resistors typically are about 5 microns thick, and therefore it takes time for a laser pulse to heat through the entire resistor due to thermal diffusivity. Typically, 100 nanoseconds is a good pulse width for such a resistor, but below 70 nanoseconds the pulse might not have enough time to penetrate all the way through the resistor and hence might leave some resistor material at the bottom of the kerf. This material can promote leakage currents and compromise resistor performance. At a pulse width of 300 nanoseconds, on the other hand, the resistor will be penetrated completely, but heat might tend to dissipate laterally through the resistor because the pulse is so long. This lateral heat conduction can result in a melting zone and residue at the edge of the resistor kerf, which can change the temperature coefficient of resistance (TCR) and cause microcracking. Microcracking can, in turn, cause long-term resistance drift.

In addition to pulse width, the energy of the laser pulses is also important because a certain amount of energy is required to vaporize the resistor material.

Also, the speed of trimming is important, with high trimming rates typically being desirable. The ultimate limit to the trimming rate is a function of the amount of energy per pulse that is to be delivered to the resistor. This energy per pulse is approximately 200 to 300 microjoules per pulse, depending on the type of resistor paste that is used. For a laser having an average power of 7 watts, if the desired energy per pulse is 200 microjoules, the repetition rate of the pulses cannot exceed 7 watts divided by 0.0002 joules, or 35 kilohertz. If the desired energy per pulse is 300 microjoules then the repetition rate of the pulses cannot exceed 7 watts divided by 0.0003 joules, or about 23 kilohertz. The higher energy per pulse of 300 microjoules would typically be used for low-ohm materials, which are ordinarily trimmed at lower repetition rates anyway.

The dynamic pulse width control technique described below is implemented using a high-power, short pulse width, diode-pumped laser. This laser system can provide 30-nanosecond pulses at low repetition rates and 125-nanosecond pulses at 50 kilohertz, in comparison to lamp-pumped laser systems that provide 70-nanosecond pulses at low repetition rates and 300-nanosecond pulses at 40 kilohertz. Nevertheless, the dynamic pulse width control technique can alternatively be implemented using a lamp-pumped laser system.

The dynamic pulse width control described below can allow a laser, such as the Spectra Physics DPL laser system, for example, to provide 125-nanosecond pulse widths at any repetition rate, from a single pulse to 50 kilohertz.

While high repetition rates are typically desirable, such a laser might be operated at low repetition rates so as to allow resistance measurements to be made, between the pulses, while the resistor is being trimmed. If the resistance to be measured is very high, then it might typically take a relatively long time to perform each measurement accurately, and thus a lower repetition rate might be desirable. According to the invention, such a laser can be operated at a low repetition rate of about 1 kilohertz, for example, at a pulse width of about 125 nanoseconds, rather than 30 nanoseconds (which would be typical without the dynamic pulse width control). The dynamic pulse width control ensures that the pulse width is long enough to cut through the resistor material to the bottom of the resistor.

With reference to FIG. 1, laser 10 includes an energy storage rod 12 and a diode pump 14, which is pumped continuously. Energy from the diode pump enters the laser rod 12 through a lens 16 and a 100-percent reflector 18. An acousto-optical Q-switch 20, which is essentially an optical switch, is switchable on and off to cause energy to remain stored in laser rod 12. When Q-switch 20 is turned on, lasing action is inhibited, thereby allowing energy from the laser diode 14 to be delivered to the rod 12. The energy stored in laser rod 12 will increase, because Q-switch 20 blocks emission of the laser beam. About a microsecond or two after Q-switch 20 is turned off (opened) a laser pulse is emitted from laser rod 12 through reflector 24. An X-scanning mirror and a Y-scanning mirror (not shown) move the pulsed laser beam to perform trimming of a thick-film resistor.

The period of time during which Q-switch 20 is off is the "emission period." The rate at which Q-switch 20 is activated is known as the "repetition rate."

In one application of the resistor trimming system of FIG. 1, laser 10 has an intrinsically short pulse width at all repetition rates. However, the energy, pulse width, and peak power of the laser pulse depend upon the amount of energy storage. At low repetition rates the energy storage is high and therefore the pulse width is short and the energy per pulse and peak power are high. As is explained in detail below, during operation of the resistor trimming system at low repetition rates, Q-switch 20 remains open after the laser pulse subsides, and a secondary emission that includes a series of secondary pulses and continuous wave (CW) output is emitted from laser 10. These secondary pulses result from the fact that energy is continuously being pumped into energy storage rod 12 by diode pump 14. Whenever the stored energy resulting from this continuous input exceeds a threshold (the minimum energy required to overcome losses in the energy storage rod system), a secondary pulse is emitted.

The energy of the primary pulse is essentially equal to the power of pump diode laser 10 multiplied by the storage time during which the Q-switch RF power is on, causing the Q-switch to be closed. If the storage time is about 30 microseconds and the power of the laser is about 7 watts, the total energy in the primary pulse is about 210 microjoules.

At one kilohertz, the primary pulse as well as the continuous wave output together have a total energy far in excess of 210 microjoules. The primary pulse output is deflected towards the workpiece by an acousto-optic modulator (AOM) 26, which operates in synchronization with Q-switch 20. The acousto-optic modulator 26 is sufficiently fast in operation to allow the primary laser pulses to deflect to the workpiece and then, by switching off, to dump the continuous wave output and secondary pulses from the short-pulse laser onto a heat sink 28. The acousto-optic modulator 26 deflects the primary laser pulses with at least eighty percent efficiency, and more preferably about ninety percent efficiency or higher, and all of the continuous wave output and secondary pulses of short-pulse laser 10 are dumped onto heat sink 28.

Other optical shutters, such as an electro-optic modulator, a liquid crystal modulator, or a high-speed optical switch, may be substituted for acousto-optic modulator 26.

Figure 2:
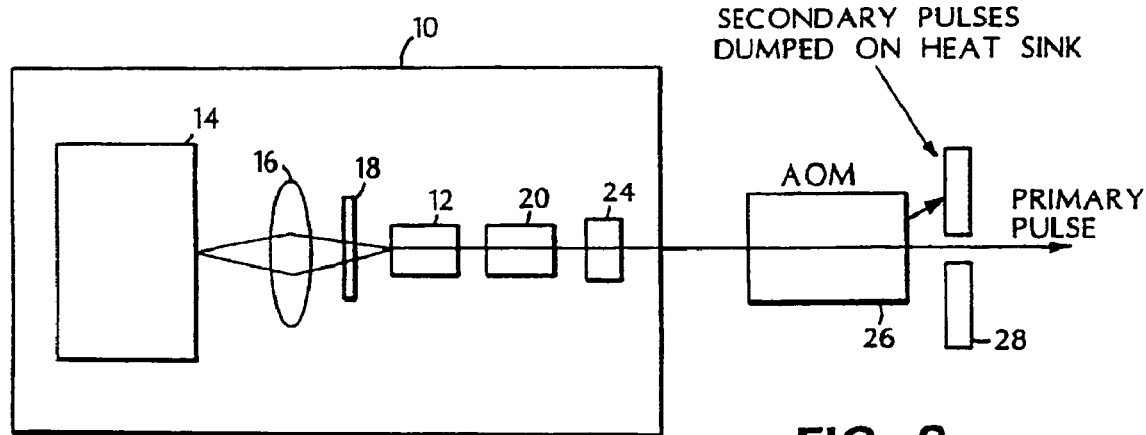
FIG. 2 is a block diagram that discloses the major components of an alternative laser system according to the invention.

According to an alternate method, the primary beam passes through acousto-optic modulator 26, which deflects the unwanted continuous wave output and secondary pulses with ninety percent efficiency as shown in FIG. 2. The method to be used is determined by the nature of the micromachining application. Thus, according to the method of FIG. 2, an optical shutter diffracts, deflects, redirects, or otherwise shutters unwanted laser output away from the workpiece, whereas according to the method of FIG. 1, an optical shutter diffracts, deflects, redirects, or otherwise shutters desired laser output toward the workpiece.

Figure 3:
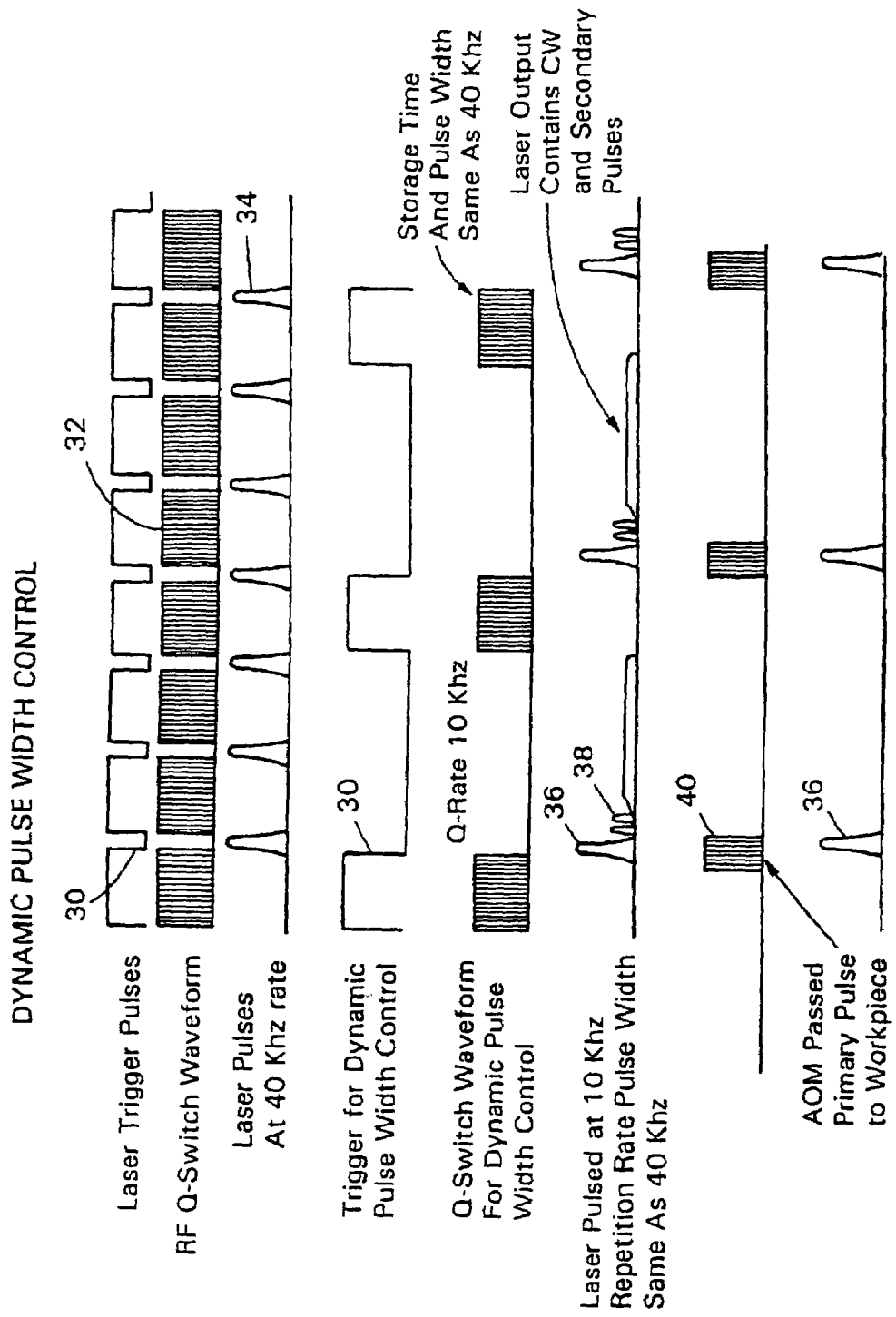
FIG. 3 is a set of waveforms illustrating operation of the laser system of FIG. 1 at a high, fixed repetition rate, and also at a low repetition rate.

FIG. 3 illustrates operation of the mechanism for dynamic pulse width control using the primary beam deflection technique as shown in FIG. 1. The top three waveforms of FIG. 3 illustrate operation of the short-pulse laser at a high, fixed repetition rate without the dynamic pulse width control. In this case the Q-switch is operated at the maximum desired repetition rate (40 Khz is shown for this example). The rise time of a laser trigger pulse 30 triggers activation of an RF Q-switch control signal 32, which in turn is applied to the Q-switch to control the on/off state of the Q-switch. While RF Q-switch control signal is activated 32, the RF signal, which is applied to the Q-switch, causes the Q-switch to be in its "on" (closed) state, and the Q-switch blocks emission of the laser beam. This causes energy to be stored in the laser rod. The falling of laser trigger pulse 30 causes RF Q-switch control signal 32 to be de-activated, and because there is no RF signal applied, the Q-switch is caused to be in its "off" (open) state. This causes optical power to build up within the laser cavity (the laser cavity consists of everything located between the 100 percent reflector and the output mirror), and a short time later a laser pulse 34 is emitted during the "emission period." After the emission period, another laser trigger pulse 30 activates RF Q-switch control signal 32 again to cause energy to be stored in the laser rod. At this high repetition rate, the "on" time for RF Q-switch control signal 32 is set to allow the maximum laser storage time between pulses 34. For example, at a repetition rate of 40 kilohertz, the storage time would be about 25 microseconds minus the time required for a pulse 34 to build up in the laser cavity and emit (which is about two to three microseconds). In alternative embodiments, the Q-switch may be an electro-optical Q-switch, and a high-voltage Q-switch control signal may be used instead of an RF Q-switch control signal.

The bottom five waveforms in FIG. 3 illustrate operation of the short-pulse laser at a low, fixed repetition rate using the dynamic pulse width control. RF Q-switch control signal 32 is activated only for a period of time necessary to provide the desired energy storage per pulse and the desired pulse width, which, for this example, is the same energy storage per pulse and pulse width as in the high-repetition-rate example of the top three drawings in FIG. 3. After the time required for energy storage has elapsed, RF Q-switch control signal 32 is deactivated, which causes the Q-switch to be turned off so as to allow the laser to emit an output. The Q-switch is maintained in its off state until storage for the next emission period is desired. According to this method, the energy storage time corresponds to the desired energy per pulse and the desired pulse width. At low repetition rates, as shown in the bottom five waveforms in FIG. 3, the laser will build up and lase in a continuous wave mode output 38 during the emission period, after the primary pulse 36 has been emitted. The output 38 after the primary pulse consists of a series of secondary pulses emitted from the laser followed by a CW output. In the embodiment of FIG. 1, an acousto-optic modulator signal 40 triggers the acousto-optic modulator just before the primary pulse 36 is to be emitted, in order to deflect the primary pulse towards the resistor, and then switches the AOM off so that the unwanted secondary and CW output is dumped on the heat sink as illustrated in FIG. 1. Accordingly, unwanted heating of the resistor to be trimmed is prevented.

Figure 4:
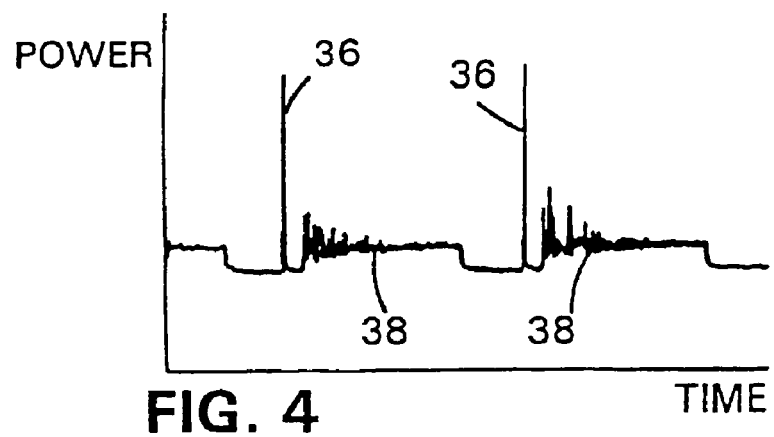
FIG. 4 is a diagram illustrating the power of the output of the laser system of FIG. 1 as a function of time in the absence of an acousto-optic modulator.
Figure 5:
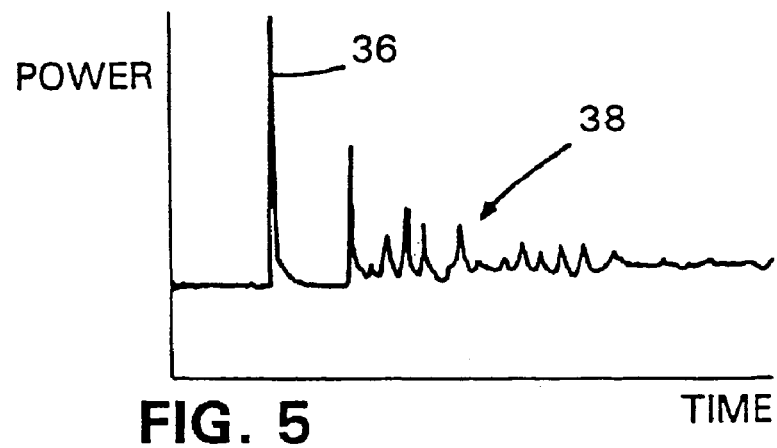
FIG. 5 is a diagram similar to FIG. 4, having a reduced time scale.
Figure 6:
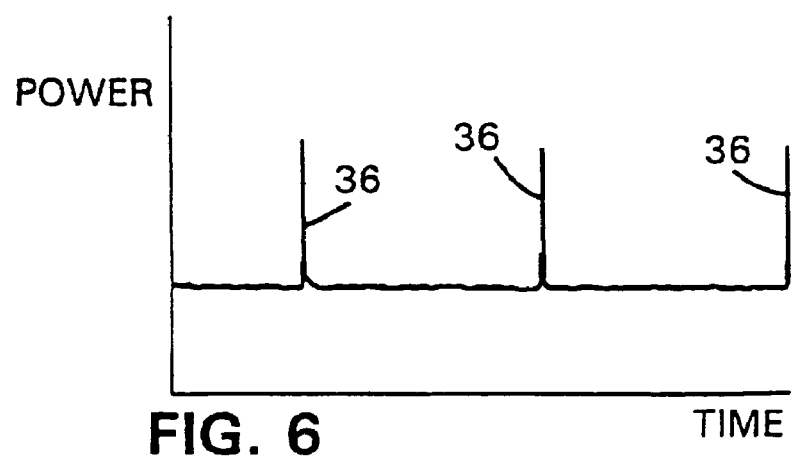
FIG. 6 is a diagram illustrating the power of the output of the laser system of FIG. 1 as a function of time, where an acousto-optic modulator is used to dump a continuous wave output from the laser onto a heat sink. Thus.

FIGS. 4 and 5 illustrate the power of the laser output, including primary pulse 36, and secondary pulses and continuous wave output 38, as a function of time in the absence of an acousto-optic modulator. FIG. 6 illustrates the power of the laser output where the acousto-optic modulator has dumped the continuous wave output from the laser onto a heat sink.

The operator can choose a desired laser pulse width by computer control. The computer is preprogrammed using a look-up table to provide the correct Q-switch storage time for the desired laser pulse width. The computer also provides the correct timing signal for the AOM deflector. Once the operator has chosen a desired pulse width, then the laser can be operated at any repetition rate below the maximum repetition rate that corresponds with this storage time, without change in the total energy per pulse or the pulse width. Thus, the energy delivered to the resistor, the pulse width, and the peak power are fixed at constant values over all repetition rates.

There have been described novel and improved apparatus and techniques for controlling pulses in laser systems. It is evident that those skilled in the art may now make numerous uses and modifications of and departures from the specific embodiment described herein without departing from the inventive concept. For example, while applications of the apparatus to thick-film resistor trimming have been disclosed, other applications of the technology are also possible, such as thick-film capacitor trimming, micro-machining of semiconductor circuits on silicon substrates, thin-film trimming of resistors or capacitors, link blowing, etc.

What is claimed is:

1. A pulsed laser system comprising:
   a laser pump;
   a laser rod;
   a reflector interposed between the laser pump and the laser rod, through which energy from the laser pump enters the laser rod;
   an output reflector through which energy is emitted from the laser rod;
   a switch interposed between the laser rod and the output reflector configured to be closed to cause energy to be stored in the laser rod for a desired period of time, and to be opened to allow energy to be emitted from the laser rod during an emission period; and
   a processor programmed to allow presetting of a pre-selected pulse shape to be produced by the laser source, based on known properties of a target material to be processed on a workpiece, to allow setting, independently of the pre-selected pulse shape, of a time interval between at least two successive transmissions of pulses onto the workpiece, and to cause the pulsed laser system to be pulsed, by causing the switch to be closed for a fixed, predetermined period of time prior to each emission period regardless of the time interval between the at least two successive transmissions of pulses onto the workpiece, so as to cause the laser source to process the target material on the workpiece, with the set time interval between the at least two successive transmissions of pulses onto the workpiece, while the pre-selected pulse shape remains as preset regardless of the time interval, without setting of the time interval affecting the pulse shape.

2. The system as claimed in claim 1, wherein the processor is programmed to cause the pulsed laser system to be pulsed so as to cause micromachining of the target material on the workpiece.

3. The system as claimed in claim 2, wherein the micromachining of the target material involves micromachining a semiconductor circuit on a silicon substrate.

4. The system as claimed in claim 2, wherein the micromachining of the target material involves trimming a trimmable component.

5. The system as claimed in claim 2, wherein the micromachining of the target material involves trimming a thick-film electrical element.

6. The system as claimed in claim 2, wherein the micromachining of the target material involves trimming a thin-film element.

7. The system as claimed in claim 2, wherein the micromachining of the target material involves trimming a resistor.

8. The system as claimed in claim 2, wherein the micromachining of the target material involves trimming a capacitor.

9. The system as claimed in claim 2, wherein the micromachining of the target material involves laser marking the target material.

10. The system as claimed in claim 2, wherein the micromachining of the target material involves micromachining a worksurface with a controlled laser pulse width.

11. A pulsed laser system comprising:
    a laser pump;
    a laser rod;
    a reflector interposed between the laser pump and the laser rod, through which energy from the laser pump enters the laser rod;
    an output reflector through which energy is emitted from the laser rod;
    a switch interposed between the laser rod and the output reflector configured to be closed to cause energy to be stored in the laser rod for a desired period of time, and to be opened to allow energy to be emitted from the laser rod during an emission period; and
    a processor programmed to allow presetting of a pre-selected time interval between at least two successive transmissions of pulses onto a workpiece, based on known properties of a target material to be processed on a workpiece, to allow setting, independently of the pre-selected time interval, of a pulse shape to be produced by the laser source, and to cause the pulsed laser system to be pulsed, with the pulse shape set independently of the pre-selected time interval, by causing the switch to be closed for a period of time prior to each emission period that is fixed and predetermined for the set pulse shape regardless of the time interval between the at least two successive transmissions of pulses onto the workpiece, so as to cause the laser source to process the target material on the workpiece, while the pre-selected time interval remains as preset regardless of the pulse shape, without setting of the pulse shape affecting the time interval.

12. A pulsed laser system comprising:
    a laser pump that is operatable continuously at constant power;
    a laser rod;
    a reflector interposed between the laser pump and the laser rod, through which energy from the laser pump enters the laser rod;
    an output reflector through which energy is emitted from the laser rod;
    a switch interposed between the laser rod and the output reflector configured to be closed to cause energy to be stored in the laser rod for a desired period of time, and to be opened to allow energy to be emitted from the laser rod during an emission period; and
    a processor programmed to allow presetting of a pre-selected pulse shape to be produced by the laser source, based on known properties of a target material to be processed on a workpiece, to allow setting, independently of the pre-selected pulse shape, of a time interval between at least two successive transmissions of pulses onto the workpiece, and to cause the pulsed laser system to be pulsed, while the laser source is continuously pumped at constant power, so as to cause the laser source to process the target material on the workpiece, with the set time interval between the at least two successive transmissions of pulses onto the workpiece, while the pre-selected pulse shape remains as preset regardless of the time interval, without setting of the time interval affecting the pulse shape.

13. A pulsed laser system comprising:
a laser pump that is operatable continuously at constant power;
a laser rod;
a reflector interposed between the laser pump and the laser rod, through which energy from the laser pump enters the laser rod;
an output reflector through which energy is emitted from the laser rod;
a switch interposed between the laser rod and the output reflector configured to be closed to cause energy to be stored in the laser rod for a desired period of time, and to be opened to allow energy to be emitted from the laser rod during an emission period; and
a processor programmed to allow presetting of a pre-selected time interval between at least two successive transmissions of pulses onto a workpiece, based on known properties of a target material to be processed on a workpiece, to allow setting, independently of the pre-selected time interval, of a pulse shape to be produced by the laser source, and to cause the pulsed laser system to be pulsed, while the laser source is continuously pumped at constant power, with the pulse shape set independently of the pre-selected time interval, so as to cause the laser source to process the target material on the workpiece, while the pre-selected time interval remains as preset regardless of the pulse shape, without setting of the pulse shape affecting the time interval.

14. A pulsed laser system having programmable pulse energy characteristics, comprising:

a laser pump;
a laser rod;
a reflector interposed between the laser pump and the laser rod, through which energy from the laser pump enters the laser rod;
an output reflector through which energy is emitted from the laser rod; a switch interposed between the laser rod and the output reflector configured to be closed to cause energy to be stored in the laser rod for a desired period of time, and to be opened to allow energy to be emitted from the laser rod during an emission period; and
a processor programmed to allow presetting of a pre-selected pulse energy characteristic to be produced by the laser source, based on known properties of a trimmable component to be micro-machined on a workpiece, to allow dynamic selecting, independently of the pre-selected pulse energy characteristic, during trimming of the trimmable component, of a time interval between at least two successive transmissions of pulses onto the workpiece, so as to permit the trimmable component to be measured accurately during trimming of the trimmable component, and to cause the pulsed laser system to be pulsed, so as to cause the laser source to micro-machine the trimmable component on the workpiece, with the selected time interval between the at least two successive transmissions of pulses onto the workpiece, while the pre-selected pulse energy characteristic remains as preset regardless of the time interval, without selection of the time interval affecting the pulse energy characteristic.

15. The pulsed laser system of claim 14 wherein the laser source is a continuously pumped laser source and wherein the laser system comprises a switch configured to be closed to cause energy to be stored by the laser source for a desired period of time, and to be opened to allow energy to be emitted from the laser source during an emission period.

* * * * *

UNITED STATES PATENT AND TRADEMARK OFFICE
CERTIFICATE OF CORRECTION

PATENT NO. : 6,973,104 B2
DATED : December 6, 2005
INVENTOR(S) : Donald V. Smart It is certified that error appears in the above-identified patent and that said Letters Patent is hereby corrected as shown below:

Column 8,
Line 3, add -- electrical -- after "film".

Signed and Sealed this

Thirty-first Day of January, 2006

JON W. DUDAS
*Director of the United States Patent and Trademark Office*